(12) United States Patent
Hu

(10) Patent No.: US 7,986,364 B2
(45) Date of Patent: Jul. 26, 2011

(54) DIGITAL IMAGE PROCESSING METHOD CAPABLE OF FOCUSING ON SELECTED PORTIONS OF IMAGE

(75) Inventor: Guo-Fu Hu, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 431 days.

(21) Appl. No.: 12/233,827

(22) Filed: Sep. 19, 2008

(65) Prior Publication Data

US 2009/0160966 A1 Jun. 25, 2009

(30) Foreign Application Priority Data

Dec. 25, 2007 (CN) .......................... 2007 1 0203391

(51) Int. Cl.
*H04N 5/222* (2006.01)
(52) U.S. Cl. .................. 348/333.01; 348/222.1; 348/241
(58) Field of Classification Search ............... 348/222.1, 348/241, 333.01, 345
See application file for complete search history.

(56) References Cited

U.S. PATENT DOCUMENTS

| 6,801,717 | B1 | 10/2004 | Hofer | |
|---|---|---|---|---|
| 2005/0195317 | A1* | 9/2005 | Myoga | 348/370 |
| 2007/0115286 | A1* | 5/2007 | Kondo et al. | 345/426 |
| 2007/0248277 | A1* | 10/2007 | Scrofano et al. | 382/260 |
| 2008/0036875 | A1* | 2/2008 | Jones et al. | 348/222.1 |
| 2008/0193042 | A1* | 8/2008 | Masuda et al. | 382/275 |
| 2009/0096897 | A1* | 4/2009 | Saito | 348/241 |
| 2009/0115734 | A1* | 5/2009 | Fredriksson et al. | 345/173 |

FOREIGN PATENT DOCUMENTS

WO 2007/049634 A1 5/2007

* cited by examiner

*Primary Examiner* — Gevell Selby
(74) *Attorney, Agent, or Firm* — Clifford O. Chi

(57) ABSTRACT

A digital image capture device includes an image capture unit, a display unit, a selection unit, and a processing unit. The image capture unit is configured to capture an image. The display unit is configured to display the captured image and allow determination of a portion thereof to be selected. The selection unit is configured to allow selection of a portion of the image in response to user input based on the determination. The processing unit is configured to process the unselected portion of the image.

14 Claims, 4 Drawing Sheets

DIGITAL IMAGE PROCESSING METHOD CAPABLE OF FOCUSING ON SELECTED PORTIONS OF IMAGE

BACKGROUND

1. Technical Field

The invention relates to image capture and, more particularly, to a digital image capture device and a digital image processing method capable of focusing on selected portions of an image.

2. Description of the Related Art

In general, for some images, such as landscapes, a large depth of field (DOF) may be appropriate, while for others, such as portraits, less DOF may be more effective. To accomplish this, complicated equipment and skill are required, which may exceed the capability of most users.

Therefore, it is desirable to provide a digital image capture device and a digital image processing method thereof, which can overcome the limitations described.

BRIEF DESCRIPTION OF THE DRAWINGS

Many aspects of the disclosed digital image capture device and digital image processing method thereof should be better understood with reference to the following drawings. The components in the drawings are not necessarily drawn to scale, the emphasis instead being placed upon clearly illustrating the principles of the present digital image capture device and digital image processing method thereof. Moreover, in the drawings, like reference numerals designate corresponding parts throughout the several views.

DETAILED DESCRIPTION OF EMBODIMENTS

Embodiments of the present digital image capture device and digital image processing method thereof will now be described in detail with reference to the drawings.

Figure 1:
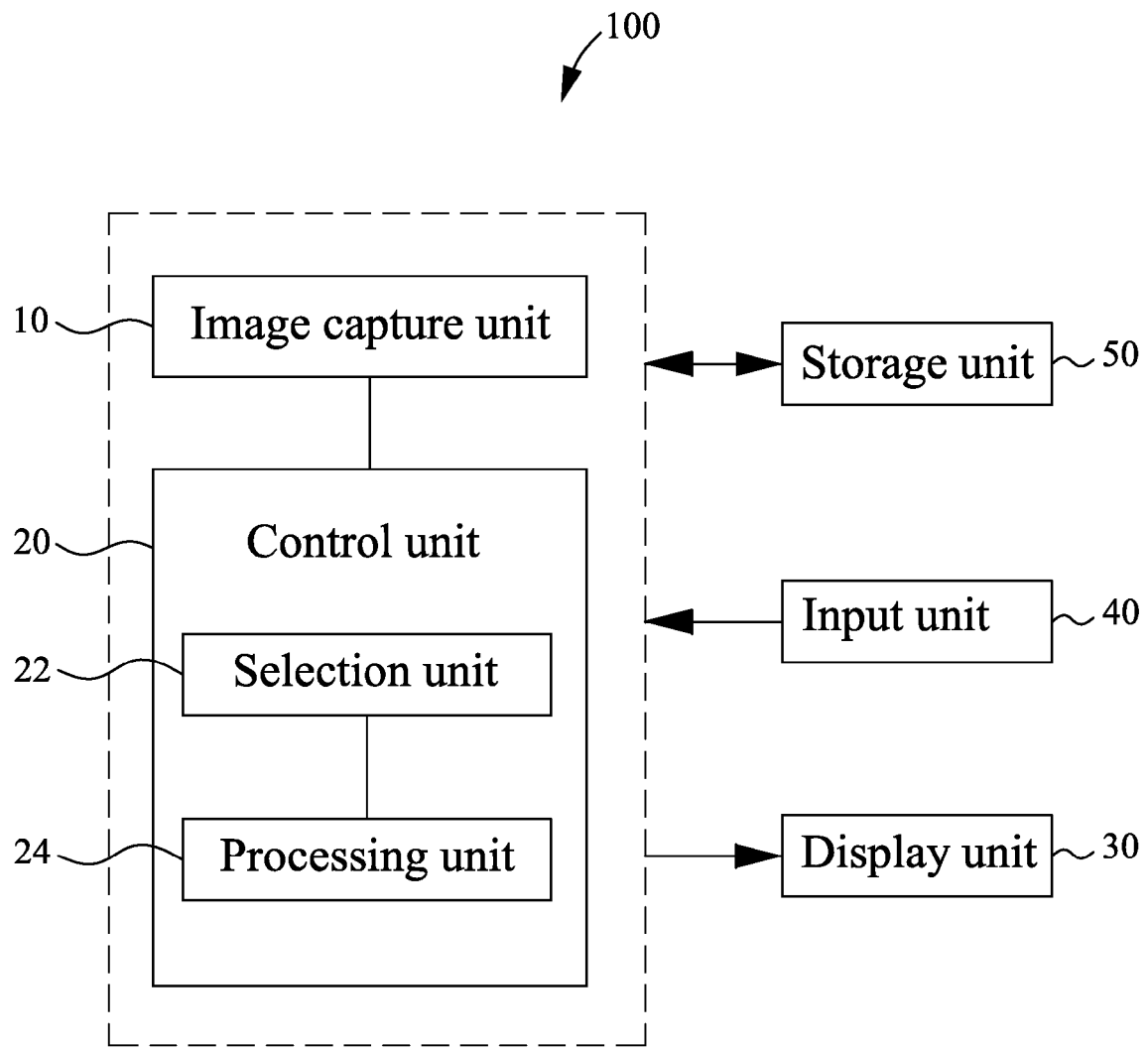
FIG. 1 is a functional block diagram of a digital image capture device, according to a first exemplary embodiment.

Referring to FIG. 1, a digital image capture device 100 includes an image capture unit 10, a control unit 20, a display unit 30, an input unit 40, and a storage unit 50.

The image capture unit 10 is configured for capturing images.

Figure 2:
FIG. 2 is a schematic view showing an image to be processed.

The display unit 30, such as a liquid crystal display (LCD) panel, is configured for displaying captured images, allowing users to determine the nature of processing to be performed, if any. For example, as shown in FIG. 2, an image captured by the image capture unit 10 is shown on the display unit 30. The user can then decide if a portion of the captured image, such as the subject, is to be featured, and another portion, such as the background, is to be made less focal.

The control unit 20 includes a selection unit 22 and a processing unit 24. The selection unit 22 is configured for allowing selection of a portion of the image displayed on the display unit 30 by user input from the input unit 40, e.g., a touch screen. Continuing to use FIG. 2 as an example, a selected portion of the captured image can include a shape enclosing the featured portion and centered thereon. Accordingly, the unselected portion of the captured image is rendered less focal. In other alternative embodiments, the selected portion can take other geometrical shapes such as a circle or a rectangle. Further, position of the selected portion in the captured image is flexible and can take any position in response to user input.

The input unit 40 is configured for receiving user input designating selection within the image. In other embodiments, the input unit 40 and the display unit 30 can be integrated into a touch panel. In practice, the input unit 40 can interpret selection of the portion of the captured image corresponding to contact made with an area of display unit 30, and accordingly the portion of the image not contacted is interpreted as the unselected portion. Alternatively, the input unit 40 can be programmed in an inverse manner, interpreting the portion of the captured image corresponding to the contacted area of the display unit 30 as the unselected portion.

Figure 3:
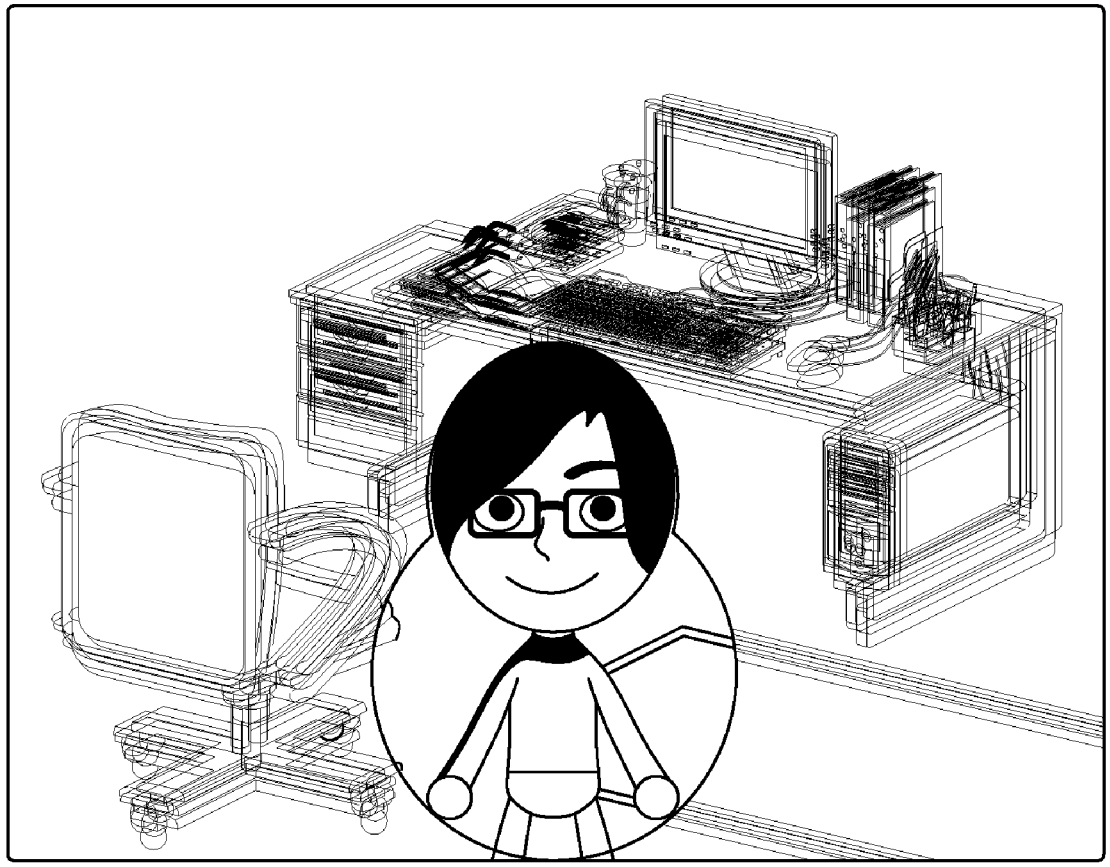
FIG. 3 is a schematic view showing the image of FIG. 2 after processing.

The processing unit 24 is configured for processing an unselected portion (see FIG. 3). In this embodiment, the processing unit 24 includes a Gaussian blur filter. The Gaussian blur filter designates a pixel of the selected portion, such as, here, the center pixel of the elliptical selected portion, as the origin of a coordinate and blurs the unselected portion using a Gaussian function:

$$G(x, y) = \frac{1}{2\pi\sigma^2} e^{-\frac{x^2+y^2}{2\sigma^2}}$$

where x is the distance from the origin along the horizontal axis, y is the distance from the origin along the vertical axis, and u is the standard deviation of the Gaussian distribution. The processing unit 24 can utilize software instructions which, when loaded into a digital signal processor (DSP), activate corresponding image processing functionality.

The storage unit 50 is configured for storing images captured, and may be a semiconductor memory, a magnetic memory or other. In this embodiment, the storage unit 50 is an erasable programmable read only memory.

Figure 4:
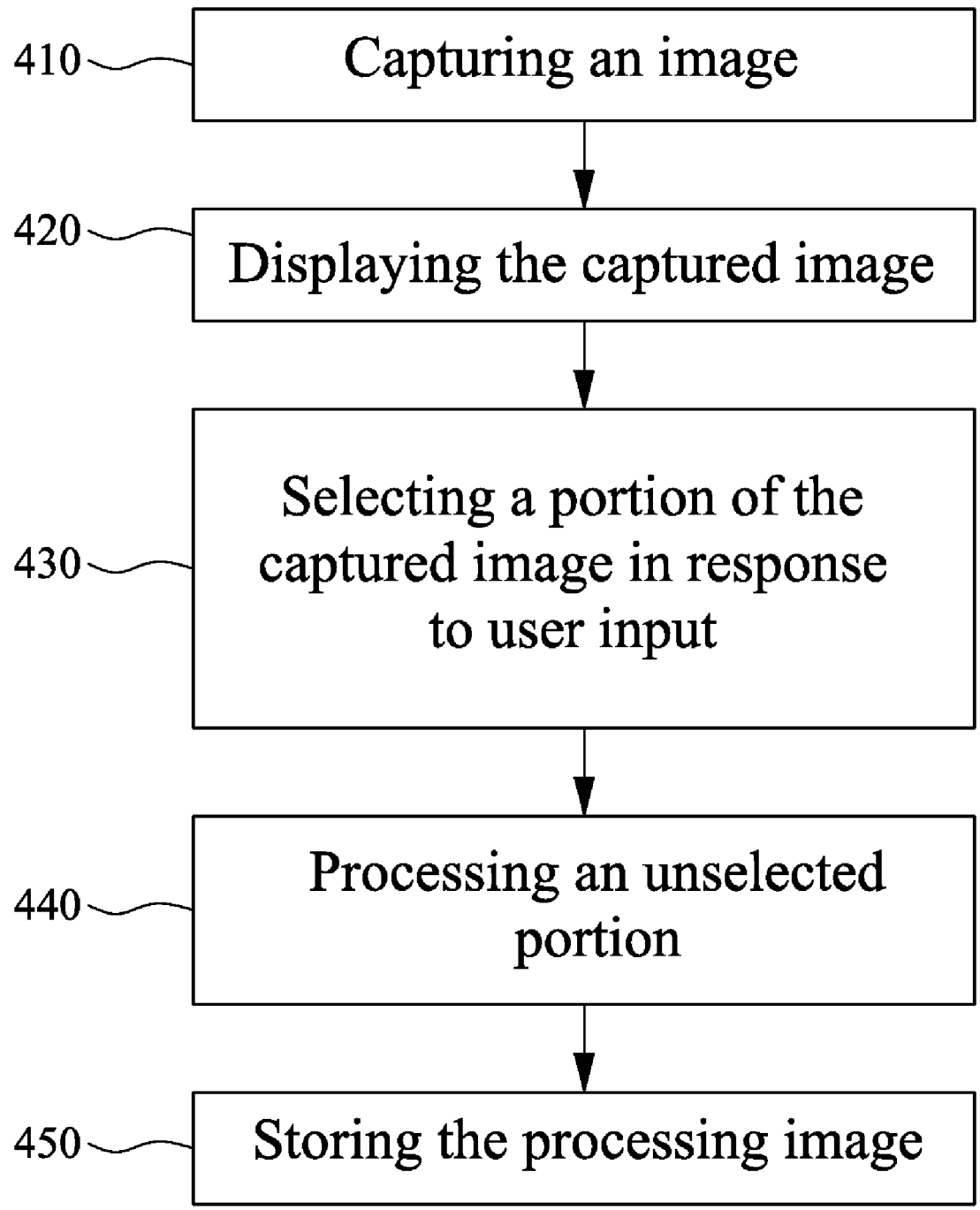
FIG. 4 is a flowchart of a digital image processing method, according to a second exemplary embodiment.

Also referring to FIG. 4, a digital image processing method includes steps 410~450. The digital image processing method can be applied to the digital image capture device 100.

In step 410, an image is captured. In this embodiment, the image is captured by the image capture unit 10.

In step 420, the captured image is displayed. In this embodiment, the image is displayed on the display unit 30.

In step 430, a portion of the captured image displayed on the display unit 30 is selected in response to user input from the input unit 40. In this embodiment, the selected portion of the selection unit 12 displayed on the display unit 30 presents an elliptical shape, the contour of which encloses the subject and is located at a center of the captured image, with an unselected portion of the captured image remaining and surrounding the selected portion. In other alternative embodiments, the selected portion can take other geometrical shapes such as a circle or rectangle, based on user selection. Furthermore, position of the selected portion is also flexible and can be moved anywhere in the captured image in response to user input.

In step 440, the unselected portion is processed. In this embodiment, the processing unit 24 includes a Gaussian blur filter. The Gaussian blur filter designates a pixel of the selected portion, such as, here, a center pixel of the elliptical selected portion, as the origin of a coordinate and blurs the unselected portion using a Gaussian function:

$$G(x, y) = \frac{1}{2\pi\sigma^2} e^{-\frac{x^2+y^2}{2\sigma^2}}$$

where x is the distance from the origin along the horizontal axis, y is the distance from the origin along the vertical axis, and u is the standard deviation of the Gaussian distribution. The processing unit 24 can take the form of software instructions, which, when loaded into a digital signal processor (DSP), activate corresponding image processing functionality.

In step 450, the processing image is stored into the storage unit 50. In this embodiment, the storage unit 50 is an erasable programmable read only memory. In other embodiment, the storage unit 50 may be a semiconductor memory, a magnetic memory or other.

The capture device 100, having a control unit 10, processes the unselected portion of the captured image while maintaining sharpness of the selected portion of the captured image.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A digital image capture device, comprising:
   an image capture unit configured for capturing an image;
   a display unit configured for displaying the captured image;
   a selection unit configured for allowing selection of a portion of the displayed image in response to user input; and
   a processing unit configured for processing an unselected portion of the displayed image, the unselected portion surrounding the selected portion of the displayed image selected by the selection unit;
   wherein the processing unit designates a pixel of the selected portion as a center point of a Gaussian function, and blurring the unselected portion using the Gaussian function.

2. The digital image capture device of claim 1, wherein the shape of the selected portion is determined by the selection unit.

3. The digital image capture device of claim 1, wherein the location of the selected portion is determined by the selection unit.

4. The digital image capture device of claim 1, wherein the selected portion is positioned on a central portion of the image.

5. The digital image capture device of claim 1, wherein the selected portion is elliptical, rectangular, or circular.

6. The digital image capture device of claim 1, further comprising a storage unit configured for storing the processing image.

7. A digital image processing method of a digital image capture device, comprising:
   capturing an image;
   displaying the captured image;
   selecting a portion of the captured image in response to user input;
   processing an unselected portion surrounding the selected portion, designating a pixel of the selected portion as a center point of a Gaussian function, and blurring the unselected portion using the Gaussian function; and
   storing the processed image.

8. The digital image processing method of claim 7, wherein the unselected portion is processed by a Gaussian blur filter.

9. The digital image processing method of claim 7, wherein the selected portion is in a central portion of the image.

10. The digital image processing method of claim 7, wherein the selected portion is elliptical, rectangular, or circular.

11. The digital image processing method of claim 7, wherein the captured image is displayed by a display unit.

12. The digital image processing method of claim 11, wherein the display unit is a liquid crystal display.

13. The digital image processing method of claim 7, wherein the processing image is stored in a storage unit.

14. The digital image processing method of claim 11, wherein the user input and the display unit are integrated into a touch panel.

* * * * *